US012776294B2

(12) United States Patent
Mailser

(10) Patent No.: US 12,776,294 B2
(45) Date of Patent: Oct. 27, 2026

(54) STRINGED INSTRUMENT SYSTEM WITH MAGNETICALLY ATTACHED ELECTRONICS MODULE

(71) Applicant: Aaron Joshua Mailser, Vancouver, WA (US)

(72) Inventor: Aaron Joshua Mailser, Vancouver, WA (US)

( * ) Notice: Subject to any disclaimer, the term of this patent is extended or adjusted under 35 U.S.C. 154(b) by 663 days.

(21) Appl. No.: 18/105,319

(22) Filed: Feb. 3, 2023

(65) Prior Publication Data

US 2023/0178054 A1 Jun. 8, 2023

Related U.S. Application Data

(63) Continuation-in-part of application No. 17/194,737, filed on Mar. 8, 2021, now abandoned.

(60) Provisional application No. 62/987,690, filed on Mar. 10, 2020.

(51) Int. Cl.
*G10D 1/08* (2006.01)
*G10D 3/14* (2020.01)

(52) U.S. Cl.
CPC ............... *G10D 1/085* (2013.01); *G10D 3/14* (2013.01)

(58) Field of Classification Search
CPC ............ G10D 1/085; G10D 3/14; G10H 1/32; G10H 3/183
See application file for complete search history.

(56) References Cited

U.S. PATENT DOCUMENTS

| | | | | |
|---|---|---|---|---|
| 5,637,823 | A * | 6/1997 | Dodge | G10H 3/18 84/743 |
| 8,283,552 | B2 * | 10/2012 | van Ekstrom | G10H 3/183 84/743 |
| 11,024,269 | B2 * | 6/2021 | Reddick | G10H 3/181 |

* cited by examiner

*Primary Examiner* — Kimberly R Lockett
(74) *Attorney, Agent, or Firm* — Clifton Leon Anderson

(57) ABSTRACT

An electric stringed musical instrument (e.g., guitar) system includes an acoustics system and an electronics system (module). The electronics system includes a base shaped to slidably engage the slot in the acoustics system. The module is held in place by respective sets of magnets in the acoustics system and the electronics system. The aggregate magnetic force near a bottom edge of the electronics system are stronger than the aggregate magnetic force near a top edge of the electronics system to ensure alignment of the bottom edges of the acoustics system and the electronics system.

20 Claims, 17 Drawing Sheets

Guitar System 100

Single Coil Electronics Module 1204

Vintage Electronics Module 1504

Vintage Electronics Module 1504

STRINGED INSTRUMENT SYSTEM WITH MAGNETICALLY ATTACHED ELECTRONICS MODULE

BACKGROUND

Guitars collectively are the best-selling instruments by far worldwide, and the best-selling guitars are electric guitars, e.g., with magnetic pickups. The sound of an electric guitar is affected by its body wood, neck wood, fingerboard, finish, and electronics, including one or more pickups. An electric guitar's pickups are transducers, which means they transfer the vibrational energy of the strings into the electrical signal that drives effects and amplifiers. There are a number of different types of pickups, pickup configurations, and associated electronics components that have a great influence on a guitar's tone.

A standard pickup is made of a magnetic core wrapped with copper wire. The magnetic core naturally creates a magnetic field, and the vibration of the guitar's strings disturbs that field, resulting in a voltage within the coil. That voltage is ultimately carried out of the guitar through the output jack connected to an amp, direct interface (DI), or pedal board. The number of times the wire is wound around the magnet, the type of the magnet itself, the number of magnets, the adjustability of pole pieces, the distance between the pickup and the strings, and the wiring path, among other factors, all have influence on a pickup's sound.

As its name indicates, a single-coil pickup only has one wire coil wrapped around a bobbin and is noted for producing bright, clean, and transparent tones. One of the drawbacks of single coil pickups is their susceptibility to noise, such as the 50 or 60-cycle hum from AC outlets, electromagnetic interference (EMI) from sources such as fluorescent lighting, and radio frequency interference (RFI) when not properly shielded.

The humbucking pickup is designed to eliminate transfer of the 50-cycle and 60-cycle hum as well as other forms of electrical interference by which single coil pickups can sometimes be plagued. A typical humbucker has two coils wound in reverse, or out of phase from each other—its magnetic poles have flipped polarity for each winding, allowing it to "buck" or cancel the hum. In addition to magnetic pickups, there are piezo-electric pickups and pickups that leverage (electret or condenser) microphone (electret or condenser) technology. An electret is a dielectric material that has a quasi-permanent electric charge or dipole polarization. An electret generates internal and external electric fields and is the electrostatic equivalent of a permanent magnet. ("Electret" is formed as a portmanteau of electr- from "electricity" and -et from "magnet"). Many guitars employ two or more pickups, which may be of the same type of different types.

DETAILED DESCRIPTION

The present invention provides a electric stringed musical instrument (e.g., guitar, bass guitar) system with an acoustics system that defines a slot into which an electronics module can be inserted and from which an electronics module can be removed. The acoustics system includes the head, neck, bridge, and body of a guitar. Typically, guitar strings extend between the head and the bridge. The acoustics system includes a slot for receiving electronics modules, each of which can include one or more pickups in various configurations and using various pickup technologies, e.g., single-coil, Humbucker, piezo-electric, etc. The pickup or pickups can be mounted on a module base or "core", which advantageously can be of wood to acoustically match wood components of the acoustics system. Herein, "wood" encompasses natural wood and wood-based products, such as plywood and simulated wood.

The module slides up into the body from the bottom of the body. The module attaches to the body magnetically, with magnets in the module being drawn to corresponding magnets in the body. The magnets' positions in the body and in the module are fixed such that corresponding magnets remain separated by distances within a range of 0.5 to 5 millimeters, 2±1 mm: close enough to secure the module in the body and far enough that the module can be removed from the body by hand. At least a first slot magnet in the body is closer to a top edge of the slot than it is to the bottom edge of the slot; at least a second slot magnet is disposed closer to a bottom slot edge of the slot than it is to a top slot edge. Likewise, at least a first module magnet is disposed closer to a top module edge than to a bottom module edge, and at least a second module magnet is disposed closer to the bottom module edge than it is to the top module edge. The aggregate magnetic strength is greater near the bottom of the module than it is near the top of the module to ensure alignment of the respective bottom edges of the module and the body even as the module expands or contracts due to humidity or other environmental conditions.

The magnets are elevated 0.5 mm-1.5 mm from the body and magnets on the module recessed about 2 mm-5 mm (e.g., 3 mm) into the module in order to form a lip that the modules "lock" into. This prevents them from falling out. During the manufacturing process, the recess for the magnets can be adjusted to increase or decrease how strongly the module locks into place. There is also a groove on the top magnet that allows the magnet to slide out more easily. The magnets are glued in with epoxy or another adhesive capable of binding metal to wood.

Figure 1:
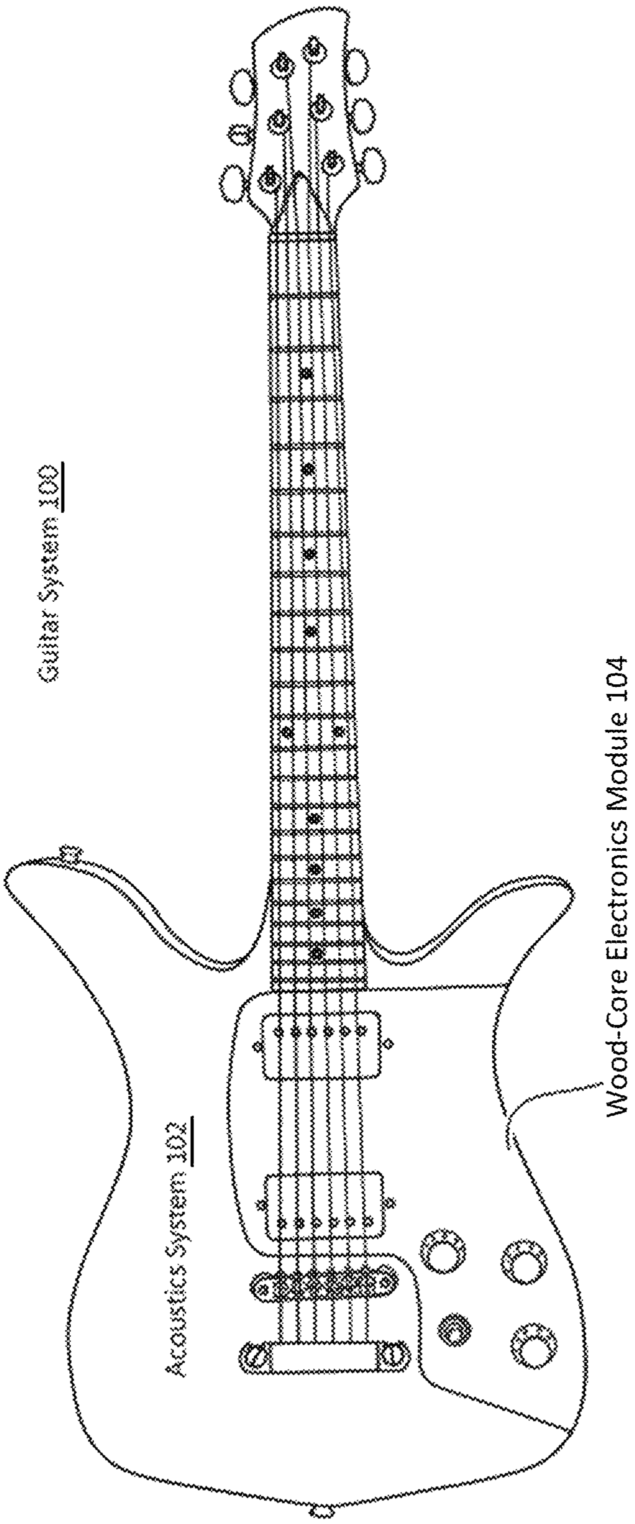
FIG. 1 is a photograph of a guitar system including a humbucker wood-core electronics module.
Figure 2:
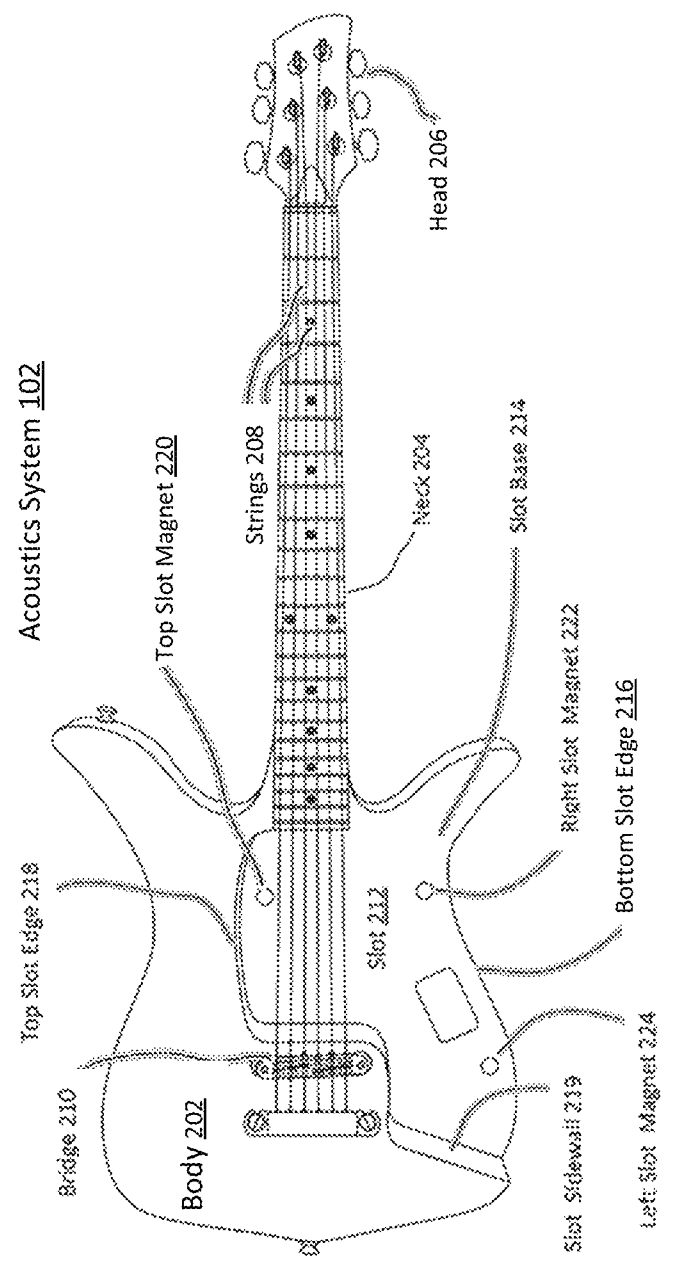
FIG. 2 is a photograph of the front of an acoustics system of the guitar system of FIG. 1, from which the electronics module has been removed.

As shown in FIG. 1, a guitar system 100 includes an acoustics system 102 and a wood-core electronics module 104. As shown in FIG. 2, acoustics system 102 includes a body 202, a neck 204, a head 206, strings 208 and a bridge 210. The neck, head, and bridge serve collectively as a mechanism for holding the strings in front of the body. Body 202 defines a slot 212 for receiving a wood-core electronics module. Slot 212 has a base 214 that extends from a bottom slot (and body) edge 216 to a top slot edge 218. A top slot magnet 220 is embedded in base 214 near (within 3 cm) of top slot edge 218 along slot sidewall 219. A right slot magnet 222 and a left slot magnet 224 are embedded in slot base 212 near to bottom slot edge 216 and more than 10 cm from each other. Magnets 220, 222, and 224 attract their counterparts on a module when it is inserted to hold the module in place within slot 212. The aggregate strength of the magnetic forces near bottom slot edge 216 is greater than the magnetic force associated with top slot magnet 220 to preferentially align the module with bottom slot edge 216 rather than top slot edge 218 for improved appearance and ergonomics. This arrangement also improves the stability of the electronics when slotted in. i.e., keeps the magnets properly aligned under the strings, and the module properly centered in the guitar, even if the wood shifts somewhat over time.

Figure 3:
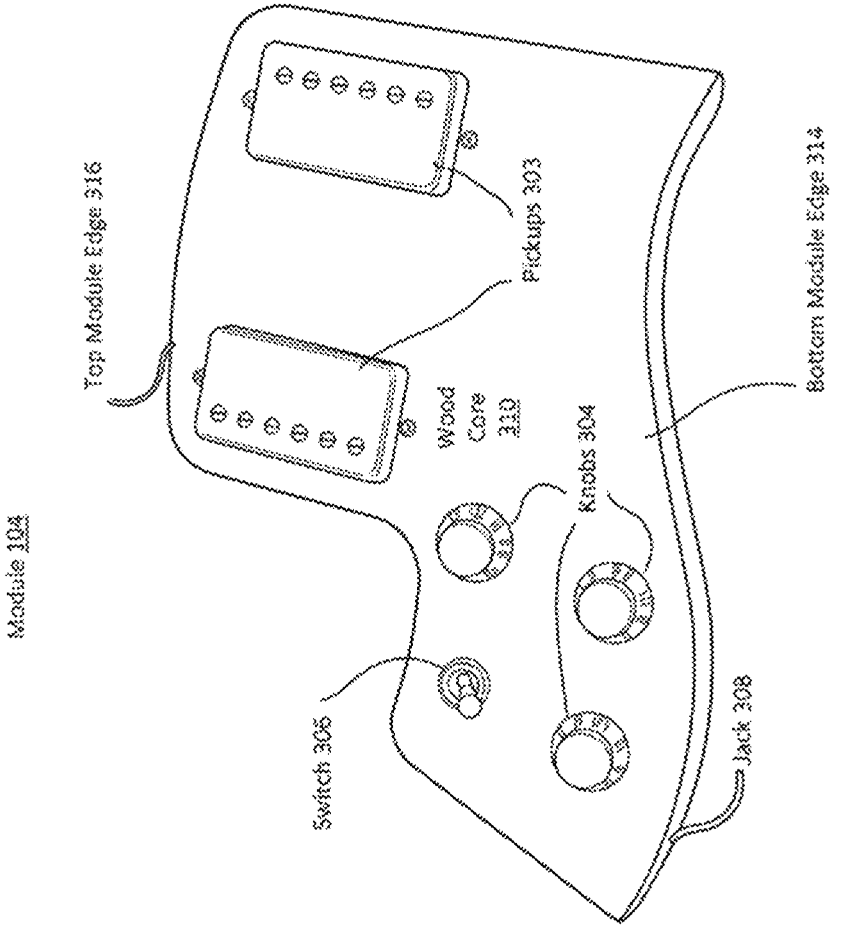
FIG. 3 is a photograph of the front of a humbucker wood-core electronics module of the guitar system of FIG. 1.

As shown in FIGS. 3 (front) and 4 (rear), module 104 includes two humbucker pickups 303, three potentiometer knobs 304, a toggle switch 306, and a quarter-inch jack 308. These components are mounted in a wood core 310 of module 104. Module 104 has a bottom module edge 314 and a top module edge 316. Note that module 104 is shaped to conform to slot 212 (FIG. 2). Word core 310 can include layers, with adjacent layers of wood having different wood grain directions for greater resistance to wood warping over time.

Figure 4:
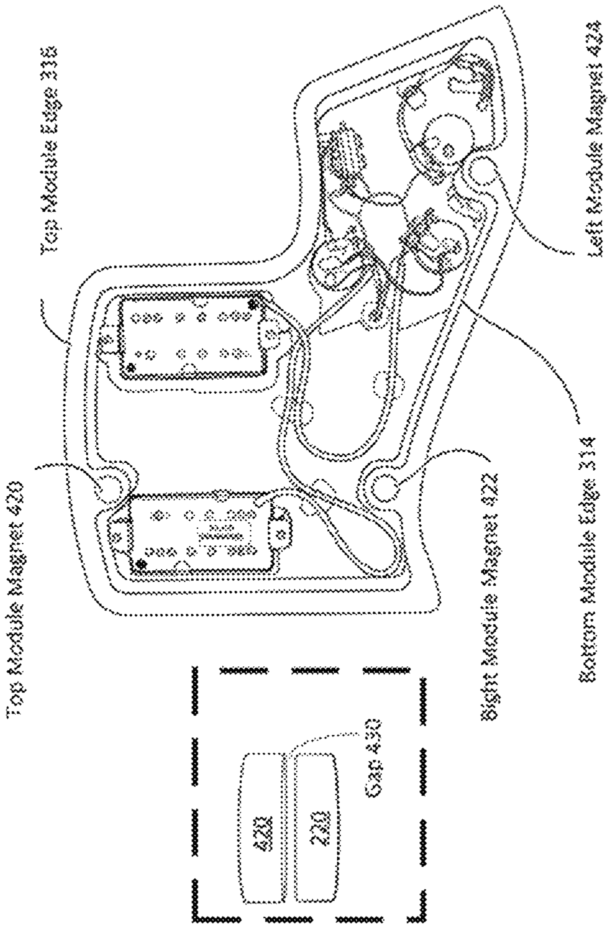
FIG. 4 is a photograph of the rear of the humbucker wood-core electronics module of FIG. 3.

As shown in FIG. 4, module 104 has a top module magnet 420 near top module edge 316, and right and left module magnets 422 and 424 near bottom module edge 314. When module 104 is engaged in slot 212, module magnets do not contact slot magnets, as show in the inset to FIG. 4 for magnets 220 and 420, which are separated by a gap 430 of 0.5-3.0 mm. This gap limits the magnetic forces to facilitate swapping of modules and bottom edge alignments. Note that other modules disclosed herein have edges and magnets conforming to the specifications for edges 314 and 316 as well as for magnets 420, 422, and 424.

Figure 5:
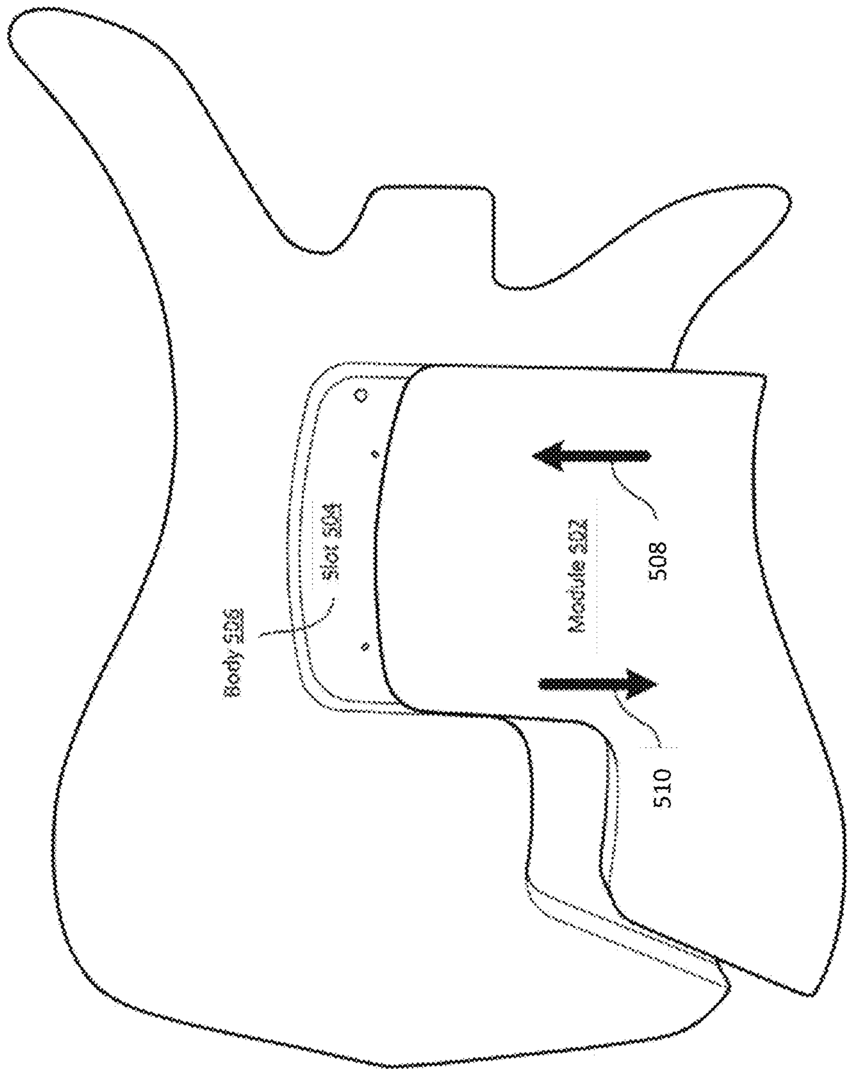
FIG. 5 is a photograph of a mock-up of the guitar system of FIG. 1 showing a module partially inserted or removed from a body of an acoustics system.

A blank electronics module 502 is shown in FIG. 5 partially inserted into a slot 504 of a body 506. An arrow 508 shows the direction of insertion from the bottom of slot 504. An arrow 510 shows the direction of removal of the electronics module.

Figure 6:
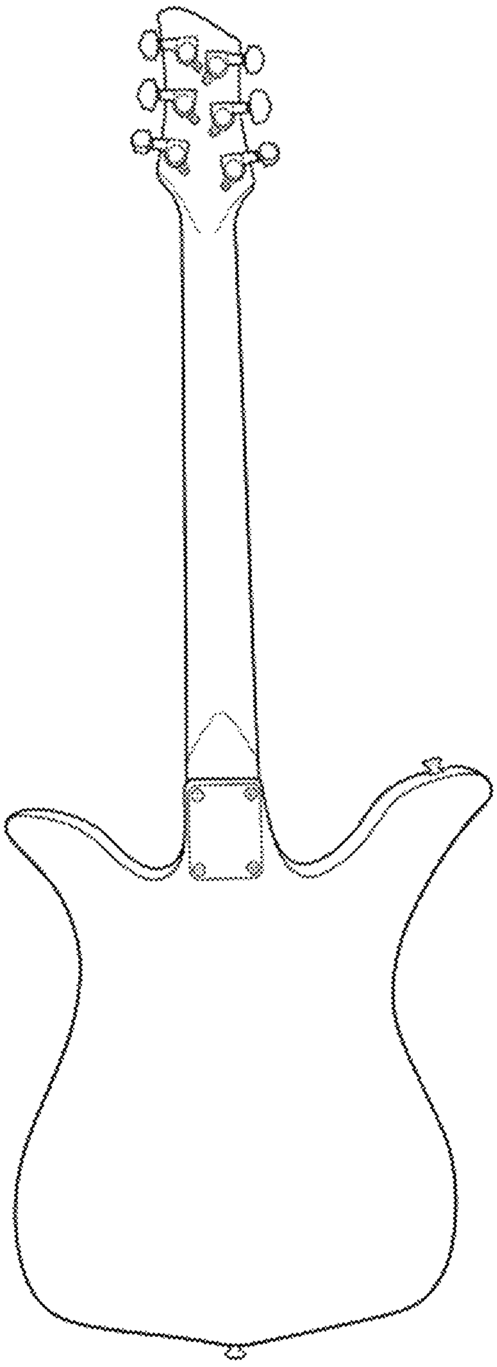
FIG. 6 is a photograph of the rear of the guitar system of FIG. 1.
Figure 7:
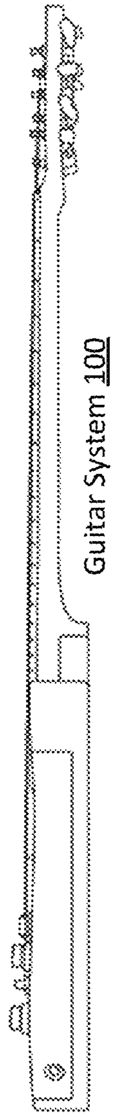
FIG. 7 is a photograph of the bottom (from a player's perspective) of the guitar system of FIG. 1.
Figure 8:
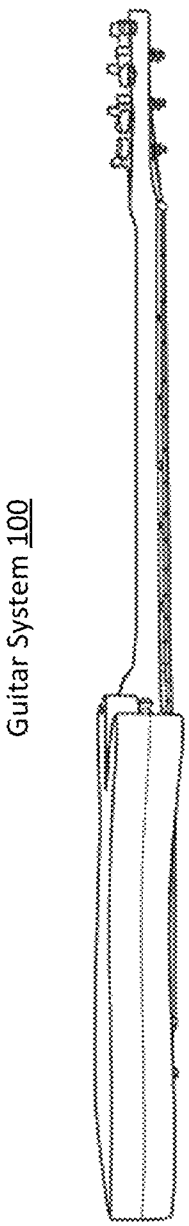
FIG. 8 is a photograph of the top of the guitar system of FIG. 1.
Figure 9:
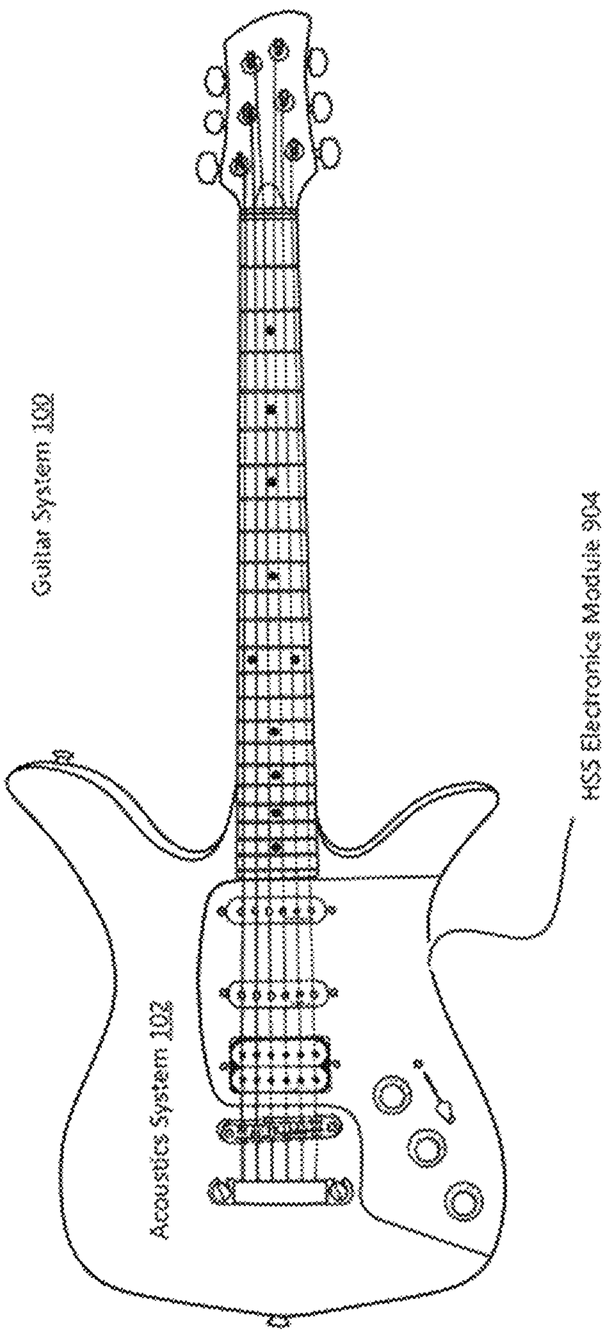
FIG. 9 is a photograph of the guitar system of FIG. 1 with an HSS (humbucker-single-single) electronics module installed.
Figure 10:
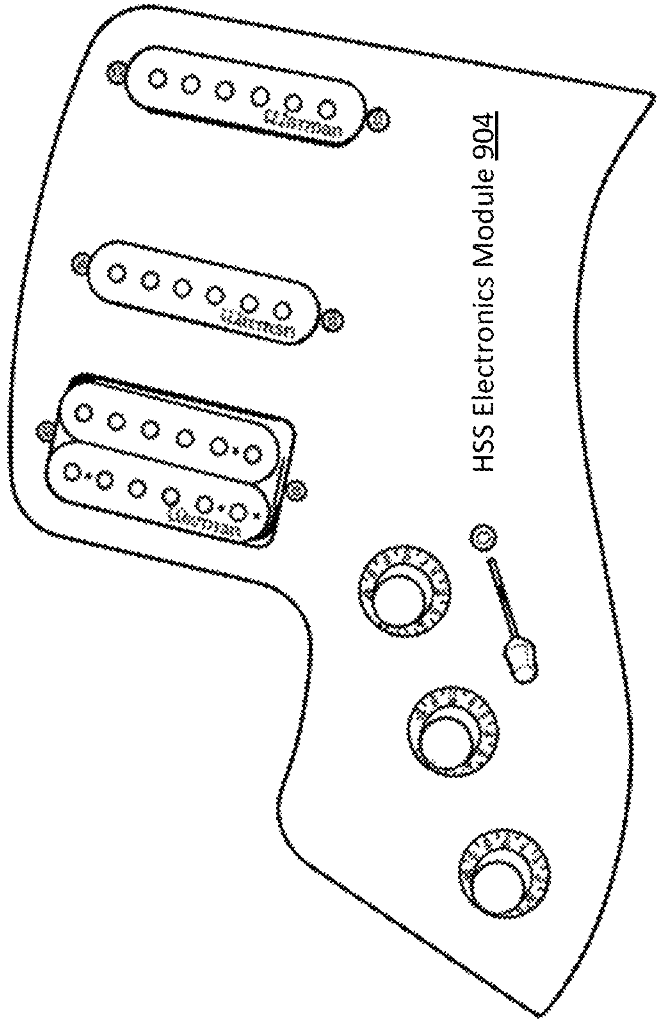
FIG. 10 is a photograph of the front of the HSS electronics module of FIG. 9.
Figure 11:
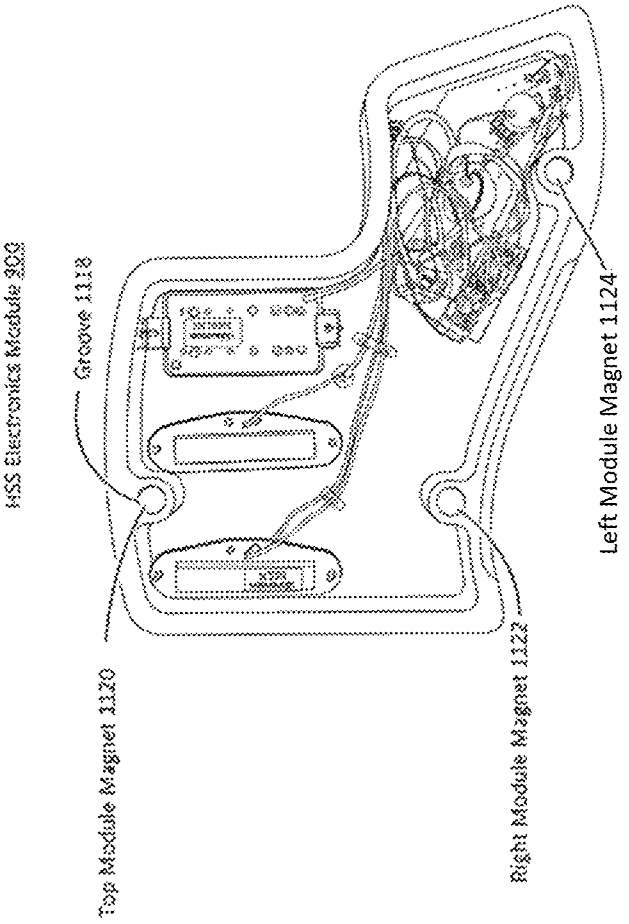
FIG. 11 is a photograph of the rear of the HSS electronics module of FIG. 10.
Figure 12:
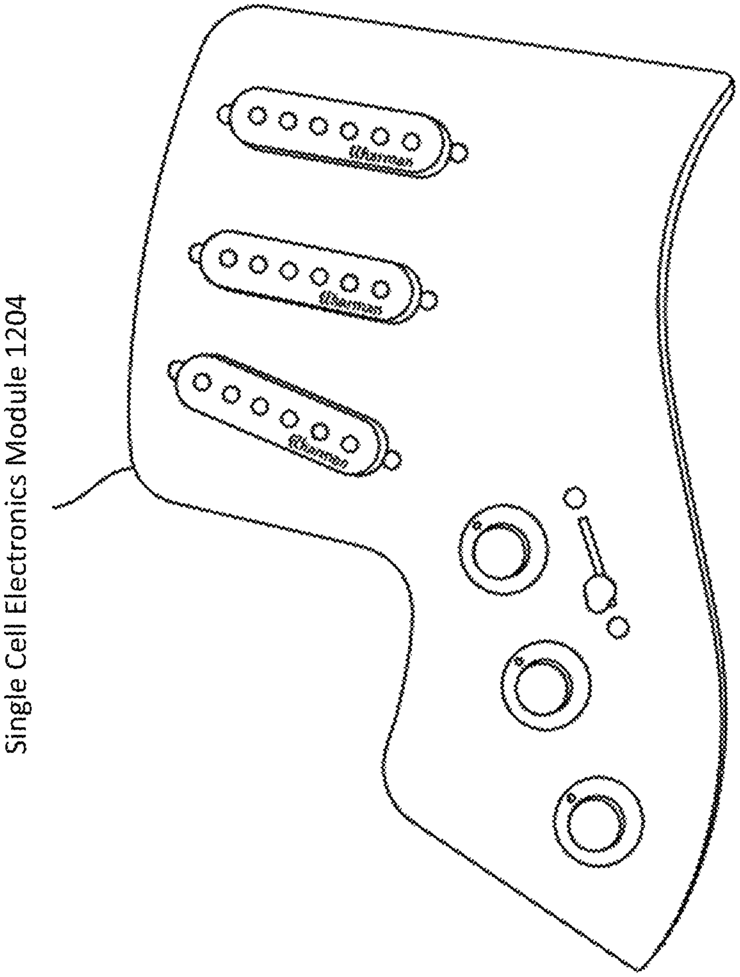
FIG. 12 is a photograph of the front of a single-coil electronics module insertable in the acoustics system of FIG. 2.
Figure 13:
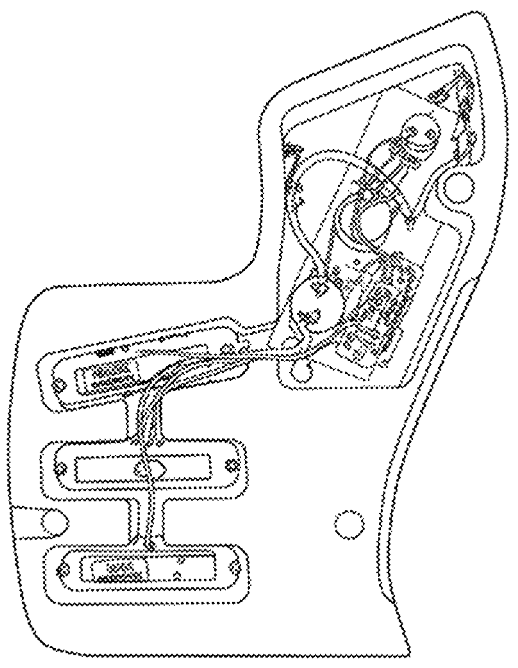
FIG. 13 is a photograph of the rear of the single-coil electronics module of FIG. 12.
Figure 14:
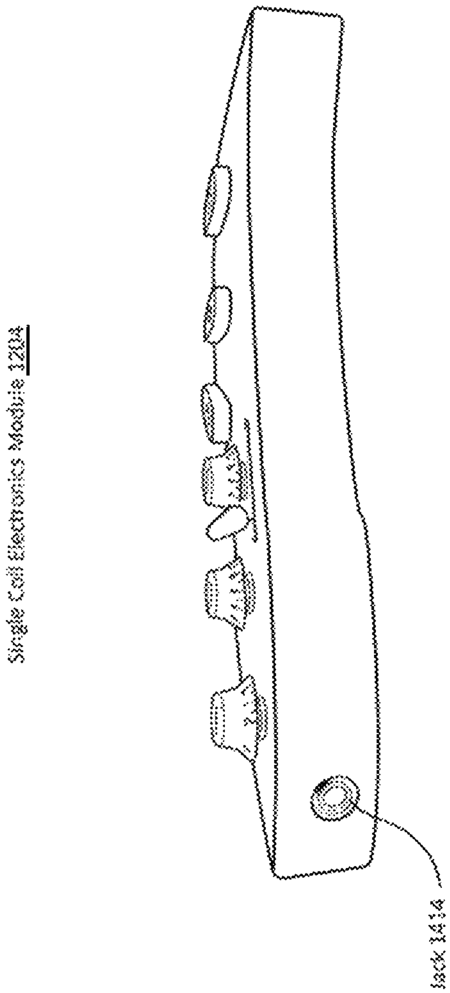
FIG. 14 is a photograph of the bottom of the single-coil electronics module of FIG. 13.
Figure 15:
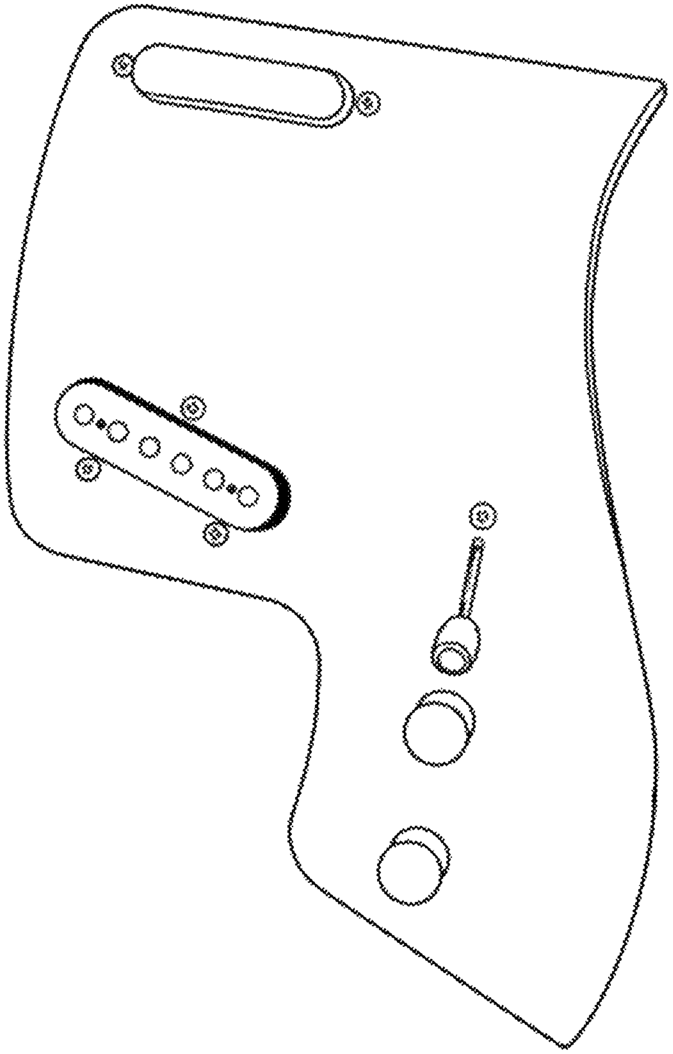
FIG. 15 is a photograph of the front of a vintage electronics module insertable in the acoustics system of FIG. 2.
Figure 16:
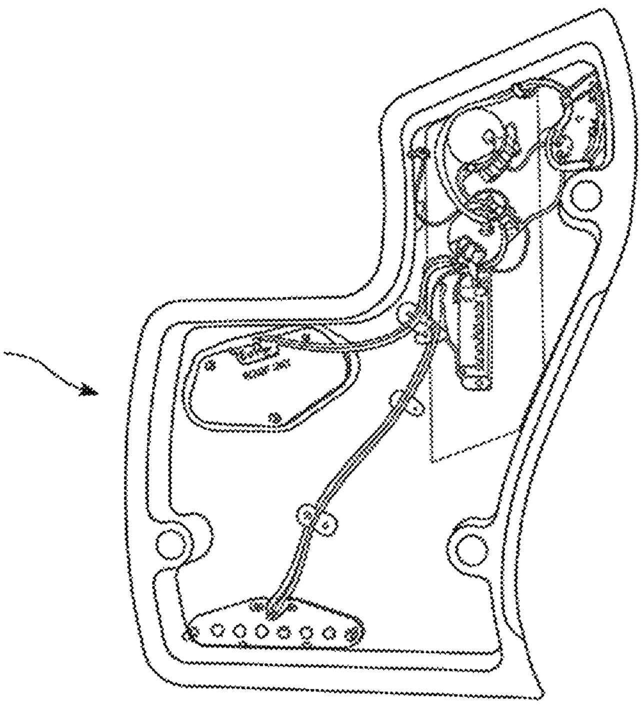
FIG. 16 is a photograph of the rear of the vintage electronics module of FIG. 15.
Figure 17:
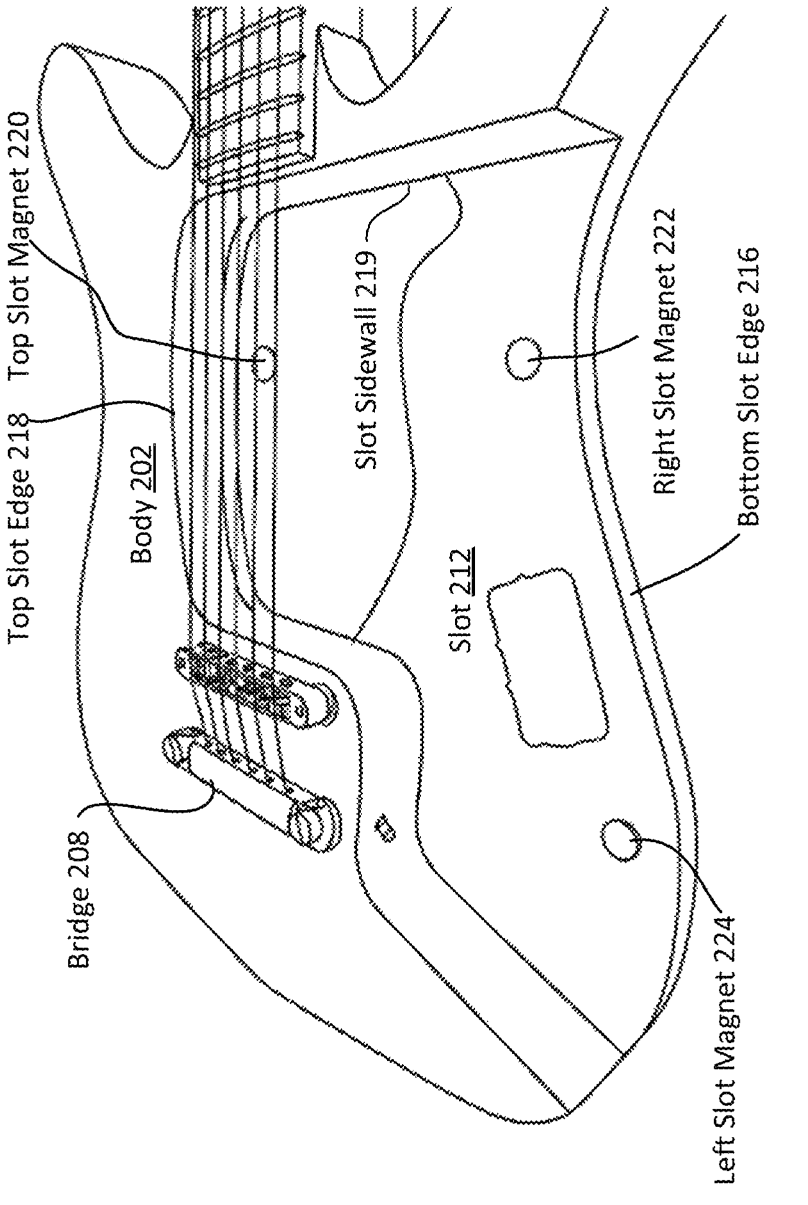
FIG. 17 is a bottom perspective photograph of a portion of the body of the acoustics system of FIG. 2 showing a detail of the slot into which electronics modules are inserted.

FIGS. 6-8 respectively show rear, bottom and top views of guitar system 100. FIG. 9 shows guitar system 100 with a different (HSS) wood-core electronics module 904 installed in acoustics system 102. FIGS. 10 and 11 respectively show front and rear views of humbucker-single-single (HSS) electronics module 904. FIGS. 12-14 respectively show front, rear, and bottom views of a single (SSS) electronics module 1204, insertable into slot 212 of body 202. FIGS. 15 and 16 respectively show front and rear views of a vintage module 1504. FIG. 17 is a close up of slot 212 in body 202.

As shown in FIG. 11, a groove 1118 extends upwards from the hole in which top module magnet 1120 is seated. The purpose of this groove is to allow module 904 to slide upward into position without snagging on protruding top slot magnet 220 (FIG. 2). Once module 904 is in its fully inserted position, bottom slot magnets 222 and 224 mechanically engage the holes in which right and left module magnets 1122 and 1124 are seated to prevent the module from accidentally slipping out the slot bottom. The bottom of the module can be lifted slightly away from the guitar body to permit downward removal of the module from the acoustic system. Similar grooves in other modules can be seen in FIGS. 13 and 16.

In addition to modules with pickups installed, the invention provides for the sale of "blank" modules which can be custom fitted with pickups and other electronics. Herein, unless otherwise specified, "electronics module" encompasses both modules with the pickups and other electronics installed and blank modules without pickups and/or other electronics installed. An acoustics module without pickups but with electronics is also provided for.

Each electronics module includes a base shaped to slidably engage the slot in the acoustics system. The module may be inserted via the (normally floor facing) bottom of the acoustics system. Not shown, but mounted on the base are electronics may include, depending on the module, pickups, a switch for selecting which pickups are active, tone and volume controls, and a jack for receiving a jack for a phone plug of a cable connecting the guitar to a guitar amplifier or the like to provide a signal from one or more pickups to the amplifier. The jack appears on the bottom of the module; the rest of these items appear on a front side of the base. Routing between these elements can be along a (player facing) backside of the base.

When the electronics system is inserted into the slot, its front (audience facing) face is coplanar (to within a +1 mm (millimeter) tolerance) with a front face of the guitar body to define a continuous top surface for the guitar. The continuous top surface can enhance resonant interaction with vibrating strings yielding what for many is a pleasing acoustic tone. In addition, the absence of a height difference between the body front and the electronics base front reduces the likelihood that a finger or pick may be snagged at their boundary. Being coplanar greatly decreases the risk that the downward motion of a pick, or strumming the instrument would cause the module to fall out, or something similar. Being coplanar is integral for the electronics to function correctly, as if the module were to sit unevenly or at a different height that normal pickups, the sound would be greatly affected. Small differences in pickup height make noticeable differences in their tone.

The depth of the slot may be between 1.0" (2.5 centimeters (cm)) and 1.5 inches (≈3.8 cm), e.g., 1.25" (3.175 cm). The thickness of the electronics base may closely match the depth of the slot for a snug fit or may be somewhat less to allow clearance for electrical connections among the controls on the front face of the base. In the latter case, the base may include ridges that engage grooves in the slot sidewall 219 (FIGS. 2, 17) to ensure coplanarity of the front faces of the base and the guitar body. The base and the body (and some other components) can be made of wood, which many players prefer for its tonal qualities and its traditional role in guitar history.

The modular guitar system offers multiple pickup and control configurations while still keeping the feel of a traditional electric guitar. Modules can be swapped in seconds, without the need to disassemble or change strings. Portability is a key factor in the design—each module boasts the functionality of a full guitar yet can easily fit into a backpack. Modules can implement various pickup and control schemes. Modular guitars are defined by their removable pickup assemblies. Traditionally, guitarists have had to change guitars when seeking different tones from different electronics. Isolating the electronics to a single removable module allows for an unlimited number of pickup and control configurations from a single guitar. This is both cheaper and more flexible than traditional configurations.

Embodiments of the invention use a wood core to house all electrical components. The wood assembly offers a wide flexibility in materials when choosing modules, including most popular tone woods. Wood allows for maximum flexibility in the electronics modules and offers a richer tone than metal or plastic modules. Different modules can be made out of most kinds of tone wood to accommodate a wide range of custom specifications. The body can be made from any kind of wood. As a traditional material, wood allows anyone with knowledge of servicing a traditional guitar to work with it. Both hollow and filled blank modules can be available in a variety of materials so customers can customize.

In one embodiment, a user can switch between two modules that are electronically identical (same pickup types and configurations), but differ only in the type of wood used for the core. Thus, the only effect on sound is due to the change of wood type. While, in the embodiments discussed above, the contemplated switch involves switching electronics modules to be used with a guitar acoustics system (including head, neck, strings, and bridge), the present invention also provides for switching acoustics systems to be used with a module. For example, acoustics systems of different sizes, geometries, and wood types could be used (at different times) with the same electronics module.

The module assembly allows for any configuration of standard guitar controls, pickups and electronics. The specific location of the magnets provide the stability necessary to wood, an inherently unstable material. Without this the changes and warping of wood over time would cause any module without a stabilizing apparatus to become nonfunctional. The multilayered assembly of the wood also creates greater stability than using traditional guitar-building techniques. This is also crucial to the guitar's integrity.

The nature of the module as a blank surface allows it to be modified to fit any configuration. By default, it is hollow in order to accommodate the widest range of pickups and electronics. However, it can easily be modified to be filled if necessary for body-through pickups. In fact, any portion of the hollow module can be filled or modified as necessary with minimal production work compared to creating a traditional guitar.

In order to prepare for production, each module is be customized to match the corresponding electronics; e.g., a humbucker module with two volume knobs, two tone control knobs and a 3-way pickup selector switch would be routed differently on a CNC machine than a module with three single coils, two volume knobs and a 5-way pickup selector switch. And for the P90 module, half of the back of the module is filled in order to accommodate for screws that would normally go through the body of a guitar.

By having this template, almost any type of guitar electronics can be slotted into the module with minimal effort. For example, if we were to provide both filled and hollow blank modules, they could easily be modified by anyone with requisite knowledge of building guitars to whatever configuration they desired.

The magnets are arranged so that two magnets are on the leading edge of the guitar (that faces the floor when standing up) and one is at the top of the guitar (the part that faces the ceiling). Having two magnets in line creates a stronger force at the bottom of the guitar, which allows the edge to remain flush/stable despite changes to the shape of the wood over time. Wood expands and contracts depending on the temperature and humidity so, by having the weaker force at the top, the module's movement is limited to that plane. Since the edge with two magnets is the stronger force, it will remain aligned to the body regardless of expansion and contraction of the wood.

The wood is stabilized to prevent potential warping of a module. To keep the wood as stable as possible, a multilayered, cross-grain assembly for the wood is required. This cross-grain assembly can be a three-ply assembly for the body or an alternative configuration.

Herein, a musical instrument is a device created or adapted to make musical sounds. In principle, any object that produces sound can be considered a musical instrument—it is through purpose that the object becomes a musical instrument. A "stringed musical instrument" is a musical instrument that produces sounds when strings vibrate in response to being bowed, plucked, strummed, struck, tapped, or otherwise. Guitars, violins, and zithers, and pianos are just a few of hundreds of examples of stringed instruments. An "electric stringed musical instrument" is a stringed musical instrument that converts the string vibrations to electric signals.

Herein, all art labeled "prior art", if any, is admitted prior art; all art not labelled "prior art", if any, is not admitted prior art. The illustrated and described embodiments, as well as modifications thereto and variations thereupon are provided for by the present invention, the scope of which is defined by the following claims.

What is claimed is:

1. An electric guitar system comprising a module set of at least one module, each module including:

a pickup set of at least one pickup that converts string vibrations into a music signal;

electronics for processing the music signal; and a core, a top module edge, a bottom module edge, and module magnets, the module magnets including at least one bottom module magnet disposed within 3 cm of the bottom module edge and at least one top module magnet disposed within 3 cm of the top module edge;

wherein, each module is co-configured with an acoustics system so that the module can be inserted into the acoustics system and behind strings of the acoustics system, each module, upon insertion, being held in place by magnetic forces between the bottom and top module magnets and corresponding bottom and top slot magnets of the acoustics system, wherein magnetic forces associated with bottom module and slot magnets are greater than the magnetic forces associated with the top module and slot magnets.

2. The electric guitar system of claim 1 further comprising the acoustics system, the acoustics system including a guitar neck, a guitar body, a guitar bridge, and guitar strings extending in front of the guitar body, the guitar body defining a slot with a slot base, bottom slot edge and a top slot edge, the slot having slot magnets including the top and bottom slot magnets, the bottom slot magnets and the top slot magnets being disposed in the base within 3 centimeters (cm) respectively of the bottom slot edge and the top slot edge.

3. The electric guitar system of claim 2 wherein, when a first module of the module set is in an inserted position with respect to the acoustics system, each slot magnet is spaced between 1 mm and 3 mm from a respective module magnet.

4. The electric guitar system of claim 2 wherein, upon insertion of a module of the module set into the slot, some magnets in a magnet set protrude into holes occupied by other magnets of the magnet set that are recessed within the holes, the magnet set including the slot magnets and the module magnets of the inserted module.

5. The electric musical instrument system of claim 1 wherein the core of at least one module of the nodule set is wood.

6. The electric guitar system of claim 1 wherein the module set includes a first module and a second module, wherein the second module can be inserted into the acoustics system while the first module is not inserted into the acoustics system.

7. The electric musical instrument system of claim 6 wherein the first module includes a first configuration of pickups, and the second electronics module includes a second configuration of pickups that is different from the first configuration.

8. The electric guitar system of claim 6 wherein the first module core is made of a first wood type and the second module includes a second core made of a second wood type different from the first wood type.

9. The electric guitar system of claim 6 wherein the first module includes a first configuration of pickups and the second module includes a second configuration of pickups that is the same as the first configuration.

10. The electric guitar system of claim 2 wherein the module magnets are recessed within respective module holes in the first module, the slot magnets being mounted in respective slot holes in the acoustics system and extending out of the respective slot holes so that, when the first module is engaged with the acoustics system, the slot magnets extend into the modules holes but remain separated by respective gaps from the module magnets.

11. A modular electric guitar process comprising:

inserting a first module of a module set of modules into a slot in an acoustics system and behinds strings of the acoustics system, the module set including modules with pickups, electronics for processing outputs from the pickups, and module magnets; and terminating the inserting when slot magnets in the acoustics system magnetically engage module magnets of the first module such that magnetic forces associated with magnets closer to the bottom edges of the module and of the slot are greater than the forces of the magnetic forces associated with magnets closer to the top edges of the module and the slot.

12. The modular electric musical instrument process of claim 11 comprising wherein, upon insertion of a module of the module set into the slot, some magnets in a magnet set protrude into holes occupied by other magnets of the magnet set that are recessed within the holes, the magnet set including the slot magnets and the module magnets of the inserted module.

13. The modular electric musical instrument process of claim 11 wherein during the terminating, the slot magnets are separated from the module magnets by respective gaps within the module holes.

14. The modular electric musical instrument process of claim 11 further comprising:

removing the first module from the acoustic system; and inserting a second module of the module set into the acoustics system.

15. An electric guitar system including an acoustics system including:

a body and a mechanism for suspending strings in front of the body, the body having a slot that extends from a bottom of the body upward and behind the strings to a top slot edge of the slot, the slot having a base, the base having a first slot magnet set of one or more magnets disposed closer to the top slot edge than to the bottom slot edge, and a second slot magnet set of magnets disposed closer to the bottom slot edge than to the top slot edge so that when a module, including a pickup set of at least one pickup and module magnets, is inserted into the slot, magnetic forces associated with slot magnets closer to the bottom edges of the module and of the slot are greater than the forces of the magnetic forces associated with magnets closer to the top edges of the module and the slot.

16. The electric guitar system of claim 15 wherein, when the module is inserted into the slot, the slot magnets protrude into the holes containing the recessed module magnets.

17. The electric guitar system of claim 15 wherein, when the slot magnets protrude into the holes, the module magnets remain spaced from the slot magnets.

18. The electric guitar system of claim 15 wherein the number of magnets in the second slot magnet set is greater than the number or magnets in the first slot magnet set.

19. The modular electric guitar process of claim 11 wherein the number of magnets closer to bottom edges of the slot and is greater than the number of magnets closer to the top edges of the slot.

20. The electric guitar system of claim 1 wherein the number of module magnets near the bottom edge of a module of the module set is greater than the number of module magnets near the top edge of the module.

* * * * *